March 15, 1938.  E. F. McGUIRE  2,111,190
FEEDER FOR STOCK
Filed Oct. 18, 1937  2 Sheets-Sheet 1
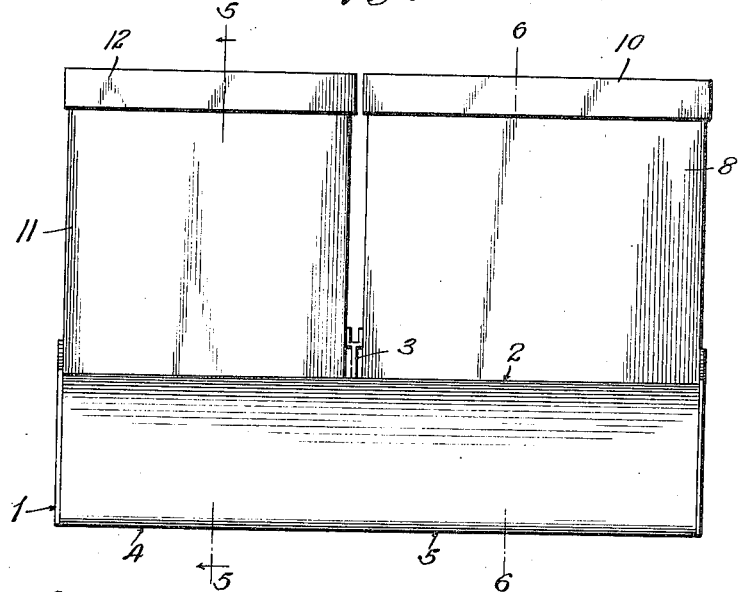
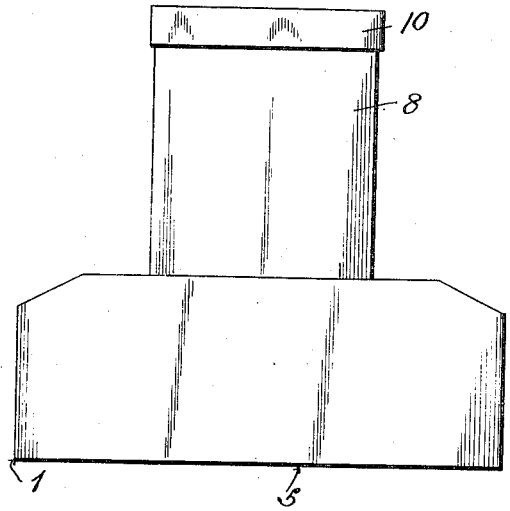
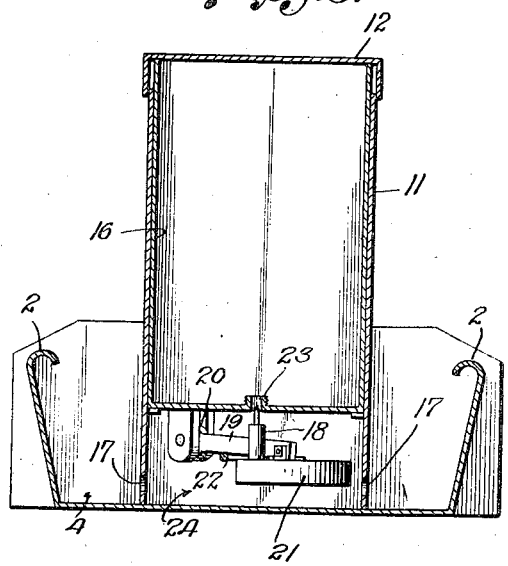
Earl F. McGuire,
INVENTOR.
ATTORNEYS.

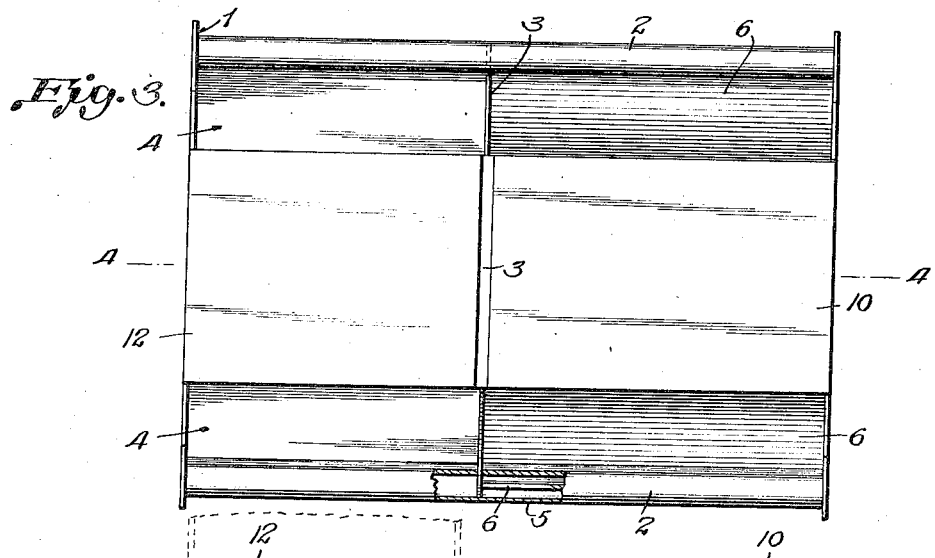
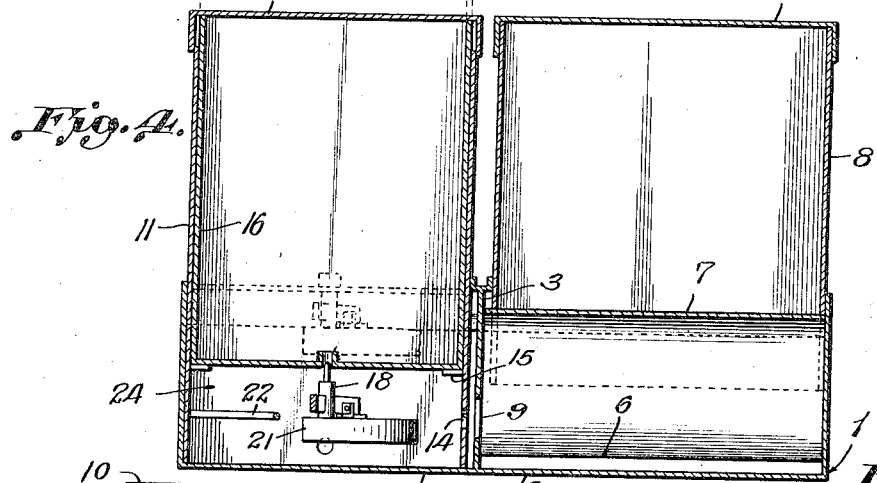
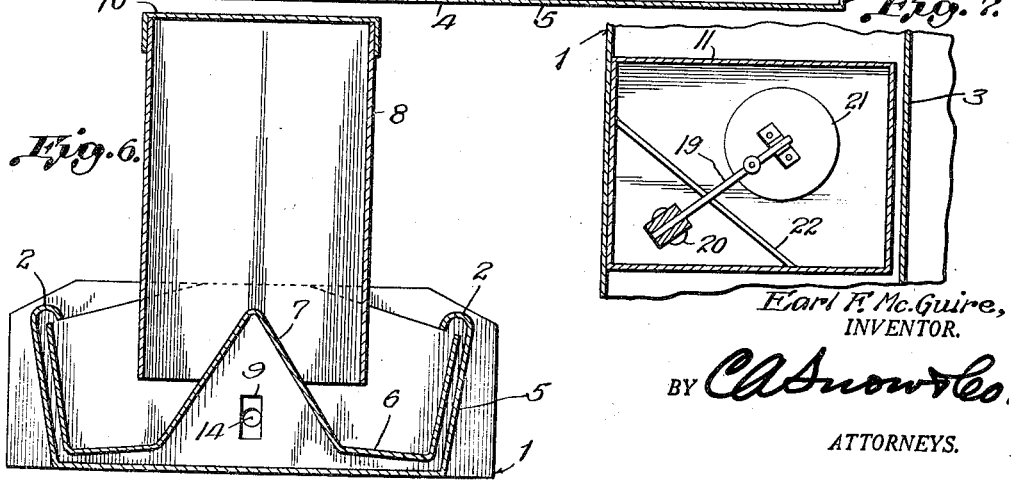
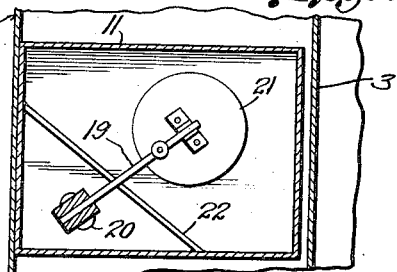

Patented Mar. 15, 1938

2,111,190

UNITED STATES PATENT OFFICE 2,111,190

FEEDER FOR STOCK

Earl F. McGuire, Coon Rapids, Iowa, assignor of one-half to Nels C. Mortensen, Coon Rapids, Iowa Application October 18, 1937, Serial No. 169,732

2 Claims. (Cl. 119—51)

This invention aims to provide novel means whereby feed in a feed trough may be moistened from water proceeding from a watering trough, novel means being supplied for governing and directing the flow of water, and novel means being supplied for delivering feed and water to the respective troughs.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in side elevation, a device constructed in accordance with the invention;

Fig. 2 is an end elevation;

Fig. 3 is a top plan wherein parts are broken away;

Fig. 4 is a vertical longitudinal section;

Fig. 5 is a section on the line 5—5 of Fig. 1;

Fig. 6 is a section on the line 6—6 of Fig. 1;

Fig. 7 is a horizontal section taken through the float chamber.

In carrying out the invention, there is provided a trough-like body 1, the side walls of which have curved overhanging flanges 2, as shown in Fig. 6. A partition 3 extends transversely of the body 1 and forms a first or watering trough 4 and a second trough 5. Secured in the second trough 5 is a feed trough 6, the side walls of which terminate under the flanges 2 of that part of the body 1 which is individual to the feed trough, the feed trough extending between the partition 3 and one end wall of the body 1. The feed trough 6 has a central, longitudinal, upstanding inverted V-shaped deflecting part 7.

A feed receptacle 8 is straddled on and secured to the part 7 of the feed trough 6 and extends between the partition 3 and one end of the body 1. There is an opening 9 in the partition 3, the opening communicating with the space beneath the part 7 of the feed trough. The receptacle 8 is surmounted by a removable lid 10.

Secured in the water trough 4 is a water holder, embodying a tubular casing 11 provided near its lower end with inwardly projecting stops 15, there being an opening 14 in the lower part of the casing 11, opposite to the opening 9 that leads to the space underneath the part 7 of the feed trough. The side wall of the casing 11 has outlets 17, through which water can pass into the water trough 4. A water receptacle 16 is mounted in the casing 11, removably, and is held frictionally therein for vertical adjustment. The water receptacle 16 carries a lid 12, and ordinarily rests on the stops 15.

In the bottom of the water receptacle or tank 16 there is an outlet 23, controlled by a valve 18 carried by a lever 19 fulcrumed at one end, as shown at 20, on the bottom of the water receptacle 16. The opposite end of the lever 19 carries a float 21, located in the float chamber 24 that exists in the casing 11, below the water receptacle 16. Downward movement of the lever 19 is limited by a stop rod 22 secured in the lower part of the casing 11.

In practical operation, water in the receptacle 16 flows through the outlet 23 into the float chamber 24, under the control of the float valve 21 and from the float chamber, by way of the openings 17, into the watering trough 4. From the float chamber 24, water flows through the openings 14 and 9 of Figs. 4 and 6 into the space between the second trough 5 and the feed trough 6. The water rises between the upright walls of the troughs 5 and 6 and overflows the upper edges of the trough 6, the feed in the trough 6 thus being moistened. The feed of course is delivered into the feed trough 6 from the receptacle 8, the part 7 dividing the feed and causing it to flow in opposite directions.

It will be understood without specific delineation, that if the water or the feed, one or both, requires heating, suitable means to that end may be provided, the same forming no part of the present invention.

The level of the water, so that it will overflow the side walls of the feed trough 6, depends to some extent upon the buoyancy of the float 21: although the water receptacle 16 may be adjusted vertically, to regulate the position of the float, vertically considered.

Having thus described the invention, what is claimed is:

1. In a device of the class described, a body comprising a watering trough and a feed trough, a water holder, means for establishing communication between the water holder and the watering trough, means for admitting water from the water holder to the feed trough, and float-controlled valve means regulating the flow from the water holder to the last-specified means.

2. In a device of the class described, a body comprising a watering trough and a feed trough, the feed trough having spaced inner and outer walls, a water holder, means for establishing communication between the water holder and the watering trough, means for admitting water from the water holder to the space between the walls of the feed trough, the inner wall of the feed trough being of less height than the outer wall of the feed trough, whereby water may rise and flow over the inner wall, and float-controlled valve means governing the flow from the water holder.

EARL F. McGUIRE.